No. 816,425. PATENTED MAR. 27, 1906.
E. BLOCK.
COMBINED HAND TORCH AND SOLDERING IRON.
APPLICATION FILED DEC. 16, 1904.
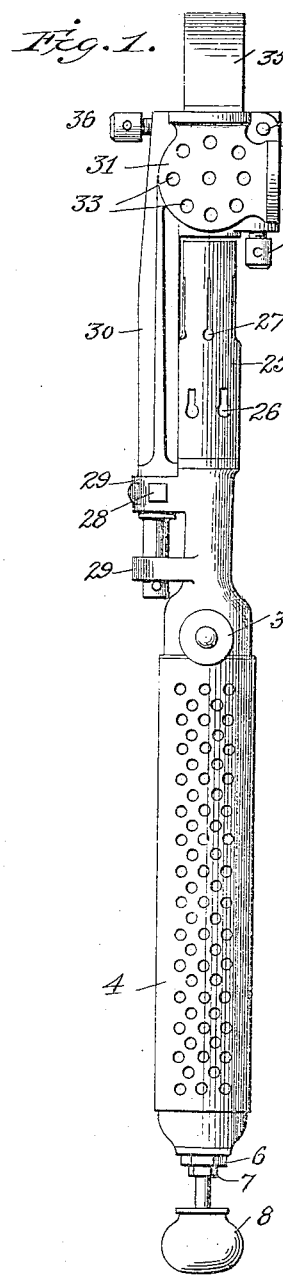
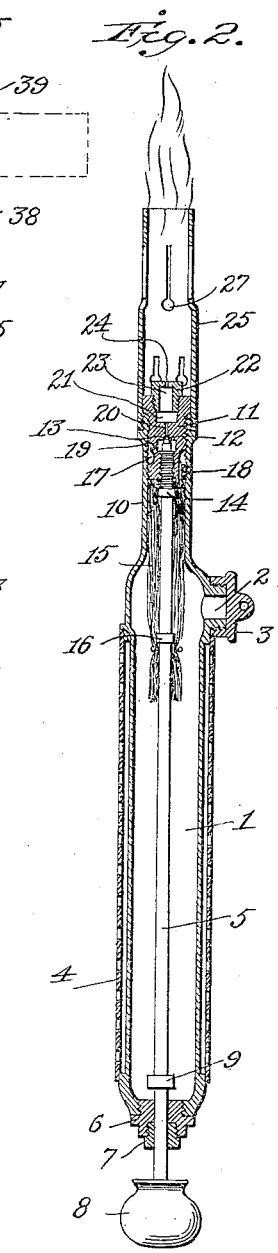
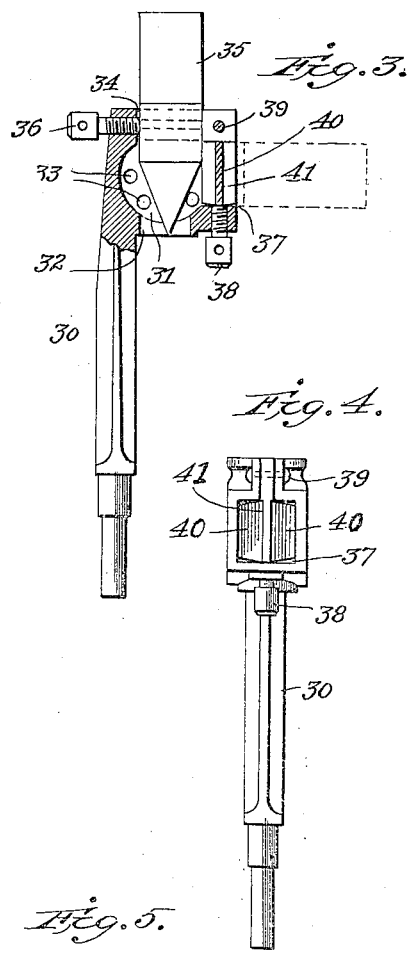
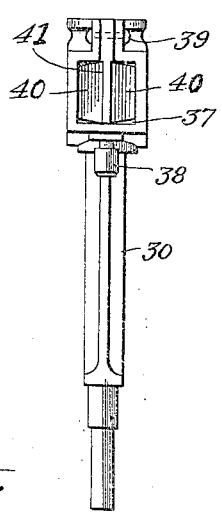
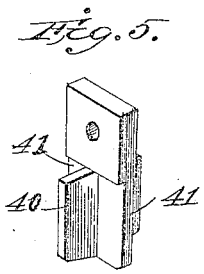
Witnesses
Edwin L. Yewell
Alex Scott
Inventor
Emile Block
by Percy B. Hills
Attorney

UNITED STATES PATENT OFFICE.

EMILE BLOCK, OF NEW ORLEANS, LOUISIANA.

COMBINED HAND-TORCH AND SOLDERING-IRON.

No. 816,425.        Specification of Letters Patent.        Patented March 27, 1906.

Application filed December 16, 1904. Serial No. 237,178.

*To all whom it may concern:*

Be it known that I, EMILE BLOCK, a citizen of the United States of America, residing at 1440 Canal street, New Orleans, State of Louisiana, have invented certain new and useful Improvements in a Combined Hand-Torch and Soldering-Iron, of which the following is a specification, reference being had therein to the accompanying drawings.

My invention has for its primary object to produce a combined hand-torch and soldering-iron, and more specifically relates, first, to certain improvements in the means for detachably uniting the hand-torch and soldering-iron-receiving chamber, and, secondly, to certain improvements in the detachable soldering-iron and its parts.

In the accompanying drawings, Figure 1 is a side elevation of my improved device, the soldering-iron and its support being shown attached. Fig. 2 is a central vertical sectional view with the soldering-iron detached, showing the device adapted for use as a hand-torch. Fig. 3 is a detail elevation, partly in section, of the soldering-iron and its support. Fig. 4 is a detail front elevation of the soldering-iron support. Fig. 5 is a detail perspective view of the shutter or damper located in the soldering-iron support.

Similar numerals of reference denote corresponding parts in the several views.

In the said drawings the reference-numeral 1 denotes a hollow chamber forming the handle of the device and also forming the reservoir for the gasolene, a filling-opening 2 being provided therein, closed by the screw-cap 3, said chamber being also provided with a perforated jacket 4 to form the handhold and to prevent undue heating of the latter when in use.

Located centrally in the chamber 1 is a stem 5, the same extending through a nut 6, screwed into the lower end of said chamber, a packing-nut 7 being also provided to prevent leakage. Said stem 5 is provided at its outer end with a handle 8 for manipulating the same and within the chamber 1, a little above the nut 6, is formed with a stop 9 to limit the downward movement of said stem, as hereinafter described.

The upper end of the chamber 1 is contracted at 10 and is internally screw-threaded to receive a burner-base 11, said burner-base being internally screw-threaded at its lower end to receive the upper screw-threaded end of stem 5, which is formed into a conical valve 12, engaging valve-seat 13 in said plug, and which also has an enlargement 14, forming a stop to receive a wick 15, wired to said stem 5, said wick being also similarly wired below beneath stop 16, all as shown. In the external screw-threaded surface of the burner-base 11 is formed an annular groove 17, communicating with the contracted upper end 10 of chamber 1 through a passage 18 in said burner-base 11 and also communicating with the interior of said burner-base at the valve-seat 13 through a passage 19 in said burner-base. Said burner-base is centrally apertured at 20 above said valve-seat, which aperture communicates above with an enlarged chamber 21, internally screw-threaded to receive the burner-tip 22, which in turn is formed with an interior chamber 23, communicating with the burner-orifice 24.

Screwed onto the upper contracted end 10 of the chamber 1 is a burner-tube 25, provided with the two series of apertures 26 and 27 for the admission of air to the interior of the same.

Detachably retained by means of the set screw 28 in the ears or lugs 29, fixed to the contracted end 10 of chamber 1, is a support 30, the same carrying at its upper end a chamber 31, having the opening 32 in its bottom, registering with the upper end of the burner-tube 25 and being provided with a plurality of small apertures 33 in its side walls for the gradual escape of the products of combustion. Said chamber is apertured in its top at 34 to removably receive a soldering-iron 35, which is retained in position by set-screw 36 and is also similarly apertured in one side at 37 to receive said soldering-iron, set-screw 38 retaining the latter in position in said aperture. Pivoted at 39 in said chamber is a shutter or damper 40, adapted to be swung to close either of the apertures 34 or 37, said shutter or damper being provided on its opposite flat faces with the wings 41, with one or the other of which the soldering-iron 35 will contact when in position in either of the apertures 34 or 37 to retain said shutter or damper in position to close the other opening against too rapid egress of the heat and products of combustion.

From the above description the operation of my improved device will be understood to be as follows: With the reservoir 1 charged with gasolene the wick 15 will absorb the same and bring it to the passage 18 in the burner-base 11, so that by applying heat externally to the contracted portion 10 for a short time the gasolene will be volatilized and will pass up through passage 18 into groove 17 and from thence through passage 19 to the valve-seat 13. Now by manipulating handle 8 the valve-stem 5 and its valve 12 may be moved downwardly to permit the passage through aperture 20 of the vapor, which will collect in the space afforded by chambers 21 and 23 in the burner-base 11 and burner-tip 22, respectively, and will pass from thence through the minute burner-orifice 24 to the point of ignition, whereupon mixing with the air admitted through apertures 26 and 27 in the burner-tube 25 it will create an intense heat, and said heat being naturally communicated downwardly to the gasolene contained in the wick 15 will maintain the supply of vapor in the well-known manner.

With the support 30 removed, as shown in Fig. 2, the device is adapted for use as a hand-torch for burning paint and other similar uses, and when it is desired to convert it into a soldering-iron it is only necessary to attach the support 30 by means of set-screw 28, when the orifice 32 in the chamber 31, carried by said support, will register with and receive the heat and products of combustion from the burner-tube 25. Now with the soldering-iron 35 inserted in one of the apertures 34 or 37 in chamber 31 the shutter or damper 40 being pivoted at 39 to swing within the chamber 31 will be forced by said soldering-iron into position to close the other aperture, and thus prevent too rapid escape of the heat and products of combustion, which will gradually and properly escape through apertures 33 after imparting their heat to the soldering-iron. It will thus be seen that my device may be used either with the soldering-iron projecting parallel with the body of the device or projecting at a right angle to said body, as may be desired.

Having thus described my invention, what I claim as new, and desire to secure by Letters Patent, is—

1. The combination with a hand-torch embodying a reservoir, a burner, and a burner-tube, of a removable support, a chamber for receiving the heat and products of combustion from said burner-tube carried wholly by said support, and a soldering-iron mounted in said chamber.

2. The combination with a burner, and a chamber mounted in operative relation thereto to receive the heat and products of combustion therefrom and having a plurality of soldering-iron-receiving apertures therein, of means within the chamber and independent of the soldering-iron for closing all but one of said apertures against egress of the heat and products of combustion.

3. The combination with a burner, and a chamber mounted in operative relation thereto to receive the heat and products of combustion therefrom and having two soldering-iron-receiving apertures therein, of a shutter or damper pivotally mounted in said chamber and adapted to close either of said apertures against egress of the heat and products of combustion.

4. The combination with a burner, and a chamber mounted in operative relation thereto to receive the heat and products of combustion therefrom and having two soldering-iron-receiving apertures therein, of a soldering-iron adapted to be removably inserted in either of said apertures, and a shutter or damper pivoted in said chamber and adapted to be turned on its pivot to close either of said apertures, said shutter or damper being held against either aperture by the contact therewith of the soldering-iron when located in the other aperture.

In testimony whereof I affix my signature in presence of two witnesses.

EMILE BLOCK.

Witnesses:
J. K. LEVEY,
ANDREW HERO.